United States Patent Office 3,067,222
Patented Dec. 4, 1962

3,067,222
ETHER-ESTERS OF CARBOXYLIC ACIDS
Arthur W. Anderson, Midland, Mich., assignor to The Dow Chemical Company, Midland, Mich., a corporation of Delaware
No Drawing. Filed Apr. 4, 1960, Ser. No. 19,469
14 Claims. (Cl. 260—410.6)

The present invention relates to ether esters of carboxylic acids and is more particularly concerned with a new and useful class of organic compounds having the general formula

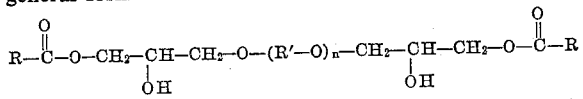

wherein R represents an organic radical having from 1 to 19 carbon atoms and selected from the group consisting of aliphatic hydrocarbon radicals, phenyl, mono, di and trialkyl-substituted phenyl, hydroxyl-substituted phenyl, aliphatic acid esters of the hydroxyl-substituted phenyl, phenylalkyl and their aliphatic and nuclear-substituted chlorine and bromine derivatives, R' represents an alkylene radical having from 2 to 4 carbon atoms, inclusive, and $n$ represents an integer from 2 to 20, inclusive. The new compounds are useful as surfactants in both aqueous and oil systems.

The compounds of the present invention can be prepared by reacting a diglycidyl ether of a polyoxyalkylene glycol, said glycol having a molecular weight of from about 106 to about 1500, with an equivalent amount of an appropriate monocarboxylic acid in the presence of a suitable catalyst. The reaction proceeds smoothly at temperatures from room temperature to about 120° C. with the production of the desired product in substantially quantitative yields. The desired product may be employed as thus obtained or purified in a conventional manner such as fractional distillation solvent extraction, and the like.

Thus one can employ as starting reactants the diglycidyl ether of the polyalkylene glycols such as diethylene glycol, triethylene glycol, polyethylene glycol 200 (a polyethylene glycol having an average molecular weight of 200), the higher molecular weight polyethylene glycols having average molecular weights from 200 to 900, the polypropylene glycols such as dipropylene glycol, tripropylene glycol, and the higher molecular weight polypropylene glycols having average molecular weights from about 200 to 1200, the polybutylene glycols such as dibutylene glycol, and the higher molecular weight polybutylene glycols having average molecular weights from 200 to 1500.

The acid reactants for preparing the new compounds are the aliphatic monocarboxylic acids having from 2 to 20 carbon atoms, inclusive, such as acetic, propionic, butyric, isobutyric, valeric, isovaleric, pivalic, caproic, isocaproic, β-dimethylbutyric, enanthic, isoenanthic, caprylic, pelargonic, capric, hendecanoic, lauric, tridecanoic, myristic, pentadecanoic, palmitic, margaric, stearic, nonadecanoic, arachidic, acrylic, crotonic, methylacrylic, ethylacrylic, tiglic, angelic, senecioic, oleic, linoleic, sorbic, and the various isomers thereof, and their chlorinated and brominated derivatives such as bromoacetic, chloroactetic, and the like, as well as the phenyl and nuclearly alkyl, hydroxyl and aliphatic acid esters of the hydroxyl-substituted phenyl monocarboxylic acids such as for example, benzoic, toluic, xylic, ethylbenzoic, diethylbenzoic, acetysalicylic, salicylic, and their chlorine and bromine analogs, such as bromoacetyl salicylic acid, chlorosalicylic acid, chloroethylbenzoic acid, bromotoluic acid and the like, and the phenyl and nuclearly alkyl-substituted phenyl aliphatic monocarboxylic acids such as for example, phenyl acetic acid, phenyl propionic acid, phenylbutyric acid, and their chlorine and bromine analogs such as bromophenyl acetic acid; phenyl bromo acetic acid and the like.

In one method of making the compounds of the present invention, a diglycidyl ether of a polyglycol and two molecular proportions of an organic monocarboxylic acid are mixed or otherwise blended together in the presence of a catalyst, such as an aliphatic amine, as for example, hexamethylene-tetramine, or an alkali metal hydroxide such as sodium hydroxide and at a temperature of from room temperature to about 120° C. The reaction is preferably carried out at from about 60° to 100° C. for a period of time sufficient to complete the reaction. Upon completion of the reaction, the desired product, usually produced in quantitative yield, may be purified by fractional distillation or solvent extraction if desired.

The following examples are illustrative of the present invention but are not to be construed as limiting.

Example 1

10 grams (2.0 molar equivalents) of stearic acid, 9.85 grams (1.0 molar equivalent) of the diglycidyl ether of polyethylene glycol (average molecular weight 400) and 0.20 gram of hexamethylenetetramine were mixed together and heated in a steam bath at 95°–97° C. for five hours. The product, an amber colored, waxy solid, was dispersible in water, soluble in peanut oil and emulsified the oil in water. The product had the following surface-active properties at the indicated concentrations in water.

| Concentration, percent | Surface Tension (dynes/cm.) | Interfacial Tension (Mineral Oil) (dynes/cm.) |
|---|---|---|
| 0.01 | 42.8 | 7.9 |
| 0.05 | 38.0 | 5.6 |
| 0.10 | 34.4 | 2.7 |
| 0.50 | 34.2 | 2.4 |
| 1.00 | 31.0 | 2.3 |

Example 2

Acetylsalicylic acid (2 moles), 1 mole of the diglycidyl ether of polyethylene glycol (average molecular weight 400) and 3.5 grams of hexamethylenetetramine were reacted in the manner of Example 1 to obtain a clear, yellow, viscous liquid insoluble but dispersible in water and having excellent surfactant, wetting and emulsifying properties.

In like manner employing the diglycidyl ether of polypropylene glycol having an average molecular weight of 1500 there was obtained a product having excellent emulsifying properties.

Example 3

In the manner of Example 1, employing bromoacetic acid (2 moles) in place of stearic acid, there was obtained a dark amber, viscous liquid which was dispersible in water, exhibited excellent surfactant properties such as wetting and dispersing properties.

In a like manner, employing dodecanoic acid in place of the bromoacetic acid, there is obtained a liquid which exhibits surfactant properties.

Example 4

In the manner of Example 1, employing acetic acid and the glycidyl ether of polybutylene glycol (the glycol having an average molecular weight 750) there is obtained the diacetate of diglycidyl ether of polybutylene glycol which product is a surfactant.

The polyoxyalkylene glycol diglycidyl ethers used in making the compounds of the present invention may be conveniently prepared by reacting the polyglycol with epichlorohydrin in the presence of alkali in the manner commonly used in making glycidyl ethers. Alternatively, the products of the invention may be produced by condensing the polyglycol iwth the glycidyl ester of a monocarboxylic acid.

This application is a continuation-in-part of my copending application Serial No. 705,737, filed December 30, 1957, and now abandoned.

I claim:

1. An ether-ester of a carboxylic acid which has the formula

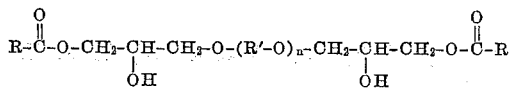

wherein R represents an organic radical containing 1–19 carbon atoms and selected from the group consisting of aliphatic hydrocarbon radicals, phenyl, mono, di and trialkyl-substituted phenyl, hydroxyl-substituted phenyl, alkanoic acid esters of the hydroxyl-substituted phenyl and phenylalkyl radicals and the corresponding chloro- and bromo-substituted radicals, R' represents an alkylene radical having from 2 to 4 carbon atoms, inclusive, and $n$ represents an integer from 2 to 20, inclusive.

2. An ether-ester of a carboxylic acid as set forth in claim 1 wherein R is an aliphatic hydrocarbon radical.

3. An ether-ester of a carboxylic acid as claimed in claim 1 wherein R is an aryl radical of the benzene series.

4. An ether-ester of a carboxylic acid as claimed in claim 1 wherein R is a chlorinated aliphatic radical.

5. An ether-ester of a carboxylic acid as claimed in claim 1 wherein R is a brominated aliphatic radical.

6. An ether-ester of a carboxylic acid as claimed in claim 1 wherein R represents an alkyl radical.

7. An ether-ester of a carboxylic acid as claimed in claim 1 wherein R represents an alkenyl radical.

8. An ether-ester of a carboxylic acid as claimed in claim 1 wherein R' represents an ethylene radical and $n$ represents the integer sufficient to give an average molecular weight of about 400.

9. An ether-ester of a carboxylic acid as claimed in claim 1 wherein R' represents a butylene radical and $n$ represents the integer sufficient to give an average molecular weight of about 750.

10. An ether-ester as claimed in claim 1 wherein R represents an alkyl radical having 17 carbon atoms, R' represents an alkylene radical having 2 carbon atoms and $n$ is an integer sufficient to give an average molecular weight of about 400.

11. An ether-ester as claimed in claim 1 wherein R represents an acetylphenyl radical, R' represents an ethylene radical and $n$ is an integer sufficient to give an average molecular weight of about 400.

12. An ether-ester as claimed in claim 1 wherein R represents a bromomethyl radical, R' represents an ethylene radical and $n$ is an integer sufficient to give an average molecular weight of about 400.

13. An ether-ester as claimed in claim 1 wherein R represents an undecyl radical, R' represents an ethylene radical and $n$ is an integer sufficient to give an average molecular weight of about 400.

14. An ether-ester as claimed in claim 1 wherein R represents a methyl radical, R' represents a butylene radical and $n$ is an integer sufficient to give an average molecular weight of about 750.

References Cited in the file of this patent

UNITED STATES PATENTS 2,575,440    Bradley _____ Nov. 20, 1951